INVENTOR
LEMUEL P. SIMS
BY
ATTORNEY

United States Patent Office 3,495,347
Patented Feb. 17, 1970

3,495,347
ADAPTER FOR MOUNTING ADVERTISING
DEVICE TO VEHICLE
Lemuel P. Sims, Box 151, Qulin, Mo. 63961
Filed May 14, 1968, Ser. No. 728,995
Int. Cl. G09f 7/18
U.S. Cl. 40—129                                    8 Claims

ABSTRACT OF THE DISCLOSURE

An adapter for use in mounting an advertising display to an axle of a vehicle, wherein said adapter includes an enlarged end which secures to the axle, and has a stem portion that projects integrally from said enlarged end and accommodates in fixed position the display. The stem portion extends through an aperture in the grease cap, and a seal is provided proximate this area to prevent leakage of the axle bearing lubricant contained in the cap.

BACKGROUND OF THE INVENTION

This invention relates generally to means for effectively adapting one member to another, and more particularly, relates to an adapter for securing an advertising display to the axle of a vehicle.

Devices for mounting various attachments, as for example, advertising signs or displays, to the front axle of an automobile have heretofore been available for usage. As is well known, the front axle of most automobiles or other vehicles is generally maintained stationary, with the wheel mechanisms mounting upon this axle being rotatable through the agency of wheel bearings. Ordinarily, the rear axles of an automobile are rotatable and in this manner furnish the driving force and torque required for vehicle movement. On the other hand, with the front axle remaining stationary, various connecting means have been employed for mounting stationarily an advertising display, device, or sign to the ends of this fixed axle. In most instances, the type of connecting means utilized has necessitated some modification in the front axle assembly, either requiring the elimination of the standard axle nut employed in holding the front wheel and accompanying bearing assembly in tact, or employing a variation in the form of axle nut used for the purpose as aforesaid. In all prior art devices heretofore disclosed for the purpose of mounting an advertising display to the front axle, their usage has required the elimination of the grease cap from the axle, thereby providing inadequate or no lubrication for the wheel bearings. Obviously such form of connectors are undesirable, since it is so necessary to maintain constant lubrication of the front wheel bearings, otherwise they will rapidly wear or burn out. Such deterioration can only be rectified by expensive repairs. Those form of connecters that have yet provided for some form of lubricating of the front wheel bearings generally include a modification in a grease holder, often one which does not retain a sufficient amount of grease of adequately or properly lubricate the front wheel bearings. Consequently, inadequate lubrication also results, and rapid deterioration of the bearings is effected. Anyone familiar with the present type of lubricating mechanisms utilized in conjunction with the front wheel bearings of an automobile readily recognize that an ample supply of lubrication is furnished and retained by the standard grease cap; and the present invention contemplates the use of an adapter which does not detract from the effectiveness of this present day grease cap as a means for providing lubrication.

Other means for mounting advertising signs or plates to an automobile generally incorporate some form of attachment which connects the display to the rotating hubcap of the vehicle. The advertisement is generally mounted to the attachment through the agency of bearings, and a weighted member attaching directly to the advertisement hopefully prevents its rotation. In operation, this form of attachment generally does not prevent at least the pivoting of the advertising display, which renders its viewing, much less reading, rather difficult by the nearby observer.

It is, therefore, an object of this invention to provide an adapter for mounting an advertising display to the stationary axle of a vehicle without requiring any change nor detailed modification in the parts forming the axle or wheel assembly.

It is a further object of this invention to provide an advertising display adapter which may be used in conjunction with the existing components comprising the axle assembly of the vehicle, including its lubricant holding grease cap, thereby insuring against a rapid wearing out of the axle bearings.

It is another object of this invention to provide an automotive adapter for mounting an advertising display to the vehicle axle which includes means for preventing unnatural dissipation of the axle bearing lubricant, but yet is sufficiently sturdy to provide a secure and rigid mounting of the display to the axle.

It is an additional object of this invention to provide an adapter for mounting advertisements to an automobile axle which is sufficiently compact and easy to use, requiring a minimum of time and effort for its application.

These and other objects of this invention will become more apparent to those skilled in the art in view of the following description and drawings.

SUMMARY OF THE INVENTION

This invention, generally stated, discloses a connecting means comprising an adapter useful for mounting an advertising display to an automobile axle. The adapter, distinct from prior art adapters requiring modification of the axle assembly to accommodate their usage, simply incorporates means for its mounting directly to the exposed threaded end of the vehicle axle, or which may be joined to the axle nut to complement its securement. The axle mounting portion of the adapter, which may be defined as its enlarged end, has a central cavity partially formed through its interior so that this cavity, after being threaded, may be screwed directly onto the axle end, or if not containing threads, may be slid in a sleeve-like manner over the axle end and be secured directly to the axle nut, as by welding or other process. In this manner the adapter may rigidly connected to the vehicle axle. The opposite end of the adapter is formed in a stem-like configuration which joins integrally with the adapter's enlarged end, and this stem portion being of reduced dimensions is disposed for easy insertion through and projecting exteriorly of the grease cap which customarily retains the wheel bearing lubricant in close proximity to this area of the axle. Proper means for sealing the minute spacing intermediate the outer surface of the stem and the grease cap aperture through which it projects is provided, and in this manner prevents any untimely or undesirable discharge of the bearing lubricant from disposition within the grease cap. The projecting stem of the adapter is properly formed to accommodate either another nut, or a screw, which in combination with the stem provides for a secure mounting of the advertising display both to the adapted, and therefore, to the stationary axle. In this manner the display is conveniently disposed for easy observation by any bystander as the vehicle approaches or passes thereby, and more importantly, is uniquely held in place by a minimum of parts that require little or no modification to or dispensation of the various mechanisms customarily utilized in forming the vehicle axle or its wheel bearing assembly.

DESCRIPTION OF THE PREFERRED EMBODIMENT

Figure 1:
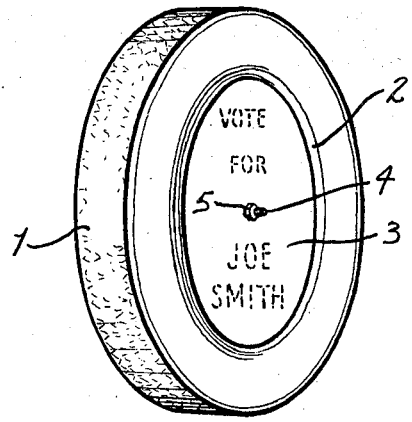
FIGURE 1 is a perspective view of a vehicle tire having an advertising display mounted thereto through the agency of the adapter of this invention.
Figure 2:
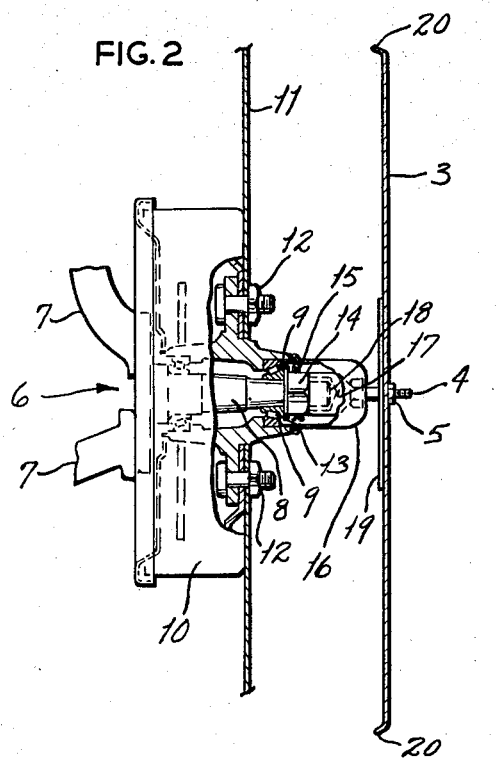
FIGURE 2 is a partial transverse sectional view of a front wheel axle and bearing assembly of an automobile, showing an advertising display secured to the end of the axle through use of the adapter of this invention.

Referring now to the drawing for an illustrative embodiment of the adapter of this invention, in FIGURE 1, reference numeral 1 generally depicts an automobile tire of the type mounted securely upon a wheel rim 2. An advertising display 3 is herein shown fixed within the confines of the inner circumference of said rim, said display being secured in place by means of the adapter 4 and its tightened nut 5. The more intricate mechanisms of the foregoing assembly are more accurately partially disclosed in FIGURE 2, wherein a front end assembly 6 of an automobile, comprising its suspension 7 and axle 8 are stationarily mounted and furnish support through their bearings 9 for the rotation of the brake drum 10 and the web 11 of the wheel rim, said rim securing to the drum and bearings by means of the lugs 12. As is customary in front end assemblies of automobiles, the rotating portion of the wheel including its bearings 9 is held laterally fixed with respect to the stationary axle by means of the washer 13 and axle nut 14, and usually, a cotter pin 15 prevents removal of said nut after it has been secured in place upon the axle. To provide for adequate lubrication of these bearings, a grease cap 16 holds a quantity of lubricant, and said cap at one end inserts for retention within the exposed end of the bearings, and rotates therewith during movement of the vehicle.

The adapter 17 of this invention is herein disclosed as being secured to the end 18 of the axle, and projects externally of the automobile grease cap 16 so as to mount, in place, the advertising display 3 as previously described; the projecting end 4 of the adapter being threaded, accommodates the nut 5 which secures the display fixed to the aforesaid adapter, which as aforesaid, is mounted to the end of the stationary axle 10. To provide rigidity in the securing of the display 3 to the adapter, an enlarged washer 19 may first be inserted upon the threaded end of the adapter, or it may have been previously engaged upon the back side of the display before it connects with the adapter.

To provide further reinforcement for the advertising display 3, its peripheral edges may be crimped, as at 20, or other reinforcing means may be employed at this location for the purpose of stiffening the display.

Figure 3:
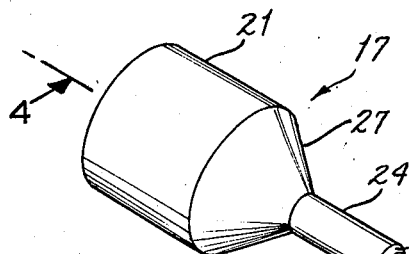
FIGURE 3 is a perspective view of the adapter of this invention.
Figure 4:
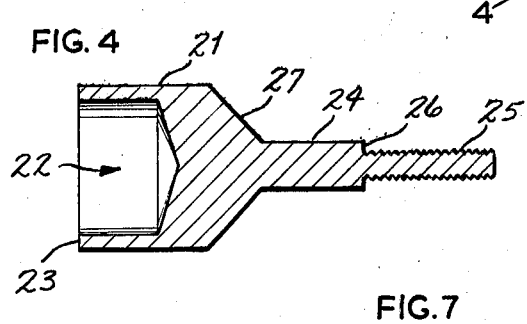
FIGURE 4 is a sectional view of the adapter taken along the line 4—4 of FIGURE 3.

The adapter of this invention is more thoroughly revealed in FIGURES 3 and 4. The adapter 17 is herein shown comprising a member having an enlarged end 21 which is provided with a central cavity 22 which extends partially through this end of the adapter, with this cavity being of sufficient diameter to provide for the easy insertion of the adapter onto the end 18 of the axle. This enlarged end 21 of the adapter is constructed to provide for its reception in a manner assimilating the application of a sleeve upon the axle end 18, with its edge 23 being secured to the axle nut 15 by any means of attachment, such as by welding or the like. In this manner, it becomes obvious that the adapter, after being secured to the axle nut, may be easily inserted onto or withdrawn from the axle along with the application or removal of the aforesaid axle nut. The opposite end of the adapter is integrally formed to a stem-like projection 24 having a sufficient length to provide for its extension and clearance beyond the end of the grease cap 16, so that the advertising display may be mounted thereupon and resist turning free from encountering any interference with the rotating grease cap. The end of the stem 24 is herein shown containing a series of threads 25, and the point of origin of threads from the stem is formed as a shoulder 26. The function of this shoulder is to accommodate the various parts of the display as previously described, in that the washer 19 after being inserted upon the threaded end of the adapter will encounter this shoulder 26 and both it and the advertising display will be securely held affixed thereto by means of the nut 5. The surface area of the adapter intermediate the segment of its enlarged end 21 and stem 24 is formed as a tapered surface 27, the purpose and usefulness of said surface to be hereinafter described.

Figure 5:
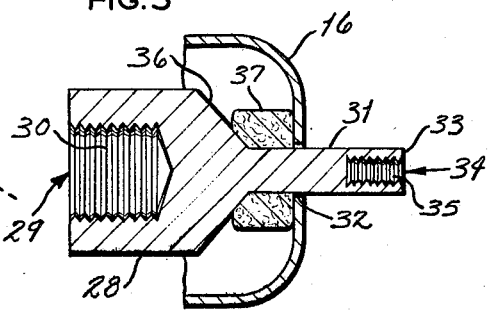
FIGURE 5 is a sectional view of a modification in the adapter of this invention, further revealing a closure means useful for preventing discharge of lubricant from the automotive grease cap.

A modification in the adapter of this invention is disclosed in FIGURE 5, wherein its enlarged end 28 is herein shown having a central cavity 29 which is tapped with a series of threads 30. In this modification, the adapter may be applied to the axle by simply screwing this threaded enlarged end directly onto the threaded end 18 of the vehicle axle. In this manner the stationary securement of the adapter to the axle is insured. This enlarged end 28 of the adapter is also shown having a projecting stem 31 which extends through an aperture 32 cut into the end of the grease cap 16. The exposed end of stem 31 is formed having an end facing 33, and an aperture 34 drilled into the stem from this end facing provides for the tapping of internal threads 35, which readily accommodate a screw (not shown) which is useful for securing the advertising device 3 and its washer 19 rigid against end facing 33 of the adapter. Thus, the advertising display may be stationarily and securely mounted in place upon the front axle of a vehicle. As previously described, the surface intermediate the enlarged end 28 and the stem 31 of the adapter is formed as a tapered surface 36, and is herein shown as providing the means for urging a closure member 37 into a close and sealing contact proximate the area where the stem 31 projects exterior through the aperture 32 provided in the end of the grease cap 16. As is well known, a vehicle grease cap is useful for holding a supply of lubricant which readily greases and conditions the wheel bearings against friction and consequential deterioration, and during vehicle movement such lubricant becomes heated, decreasing in viscosity, and more liquefied so as to provide for its easier penetration to the area of the actual bearing contact. Without the use of the closure member 37, this lubricant would easily attain leakage out of the aperture 32 and thereby be lost. The closure member, herein shown as an annulus, may be constructed of any form of fiberous or moisture retarding pliable material which is urged or biased by means of the tapered surface 36 contiguously into sealing contact proximate the area where the stem 31 projects through the aperture 32, but yet does not prevent the actual rotation of the grease cap 16 during vehicle movement. In this manner the entire supply of lubricant is retained for the purpose of its enclosure within the grease cap, to lubricate the wheel bearings.

Figure 6:
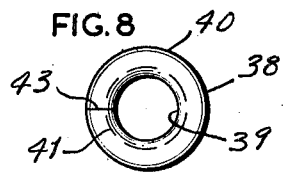
FIGURE 6 discloses a modification in a closure means useful in preventing escape of lubricant from the automobile grease cap at the location where the adapter projects therethrough.
Figure 7:
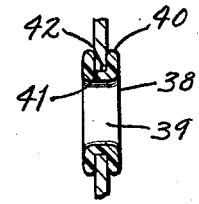
FIGURE 7 is a vertical sectional view of the closure means taken along the line 7—7 of FIGURE 6.
Figure 8:
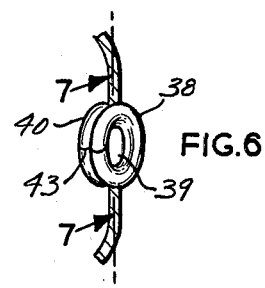
FIGURE 8 is a front view of a closure means as disclosed in FIGURE 6.

A modification in the closure means is disclosed in FIGURES 6 thru 8, wherein the means for preventing the undesirable discharge of the lubricant is effected through the usage of the sealing ring 38. The sealing ring is herein shown comprising an annular member having a central opening 39 which is formed to a diameter equivalent to the outside diameter of the stem portion of the adapter, so that this inner surface 39 of the ring may always be in semi-tight and contiguous contact with the stem, to thereby prevent any leakage of the lubricant proximate this area. The ring, around its outer circumferential surface 40 is formed having a recess 41 which provides for a seating of said ring upon the inner peripheral edge of the grease cap aperture 42, therein to be retained during the rotation of the grease cap. To facilitate the application and engagement of the sealing ring 38 upon the rim of the grease aperture, a slit 43 may be provided through one portion of the ring, and by disaligning the two ends of the ring proximate the location of this slit, the ring may be reduced in circumference a sufficient amount to provide for its insertion into the plane of the grease cap aperture, with the ring then being re-expanded to its actual size, and thereby become securely mounted to the grease cap. When a closure means such as this saling ring 38 is employed in conjunction with the adapter, although said ring may rotate along with the grease cap during vehicle movement, its inner surface 39 will be in close rubbing engagement with the stem of the adapter and thereby prevent leakage of the lubricant. This sealing ring may be constructed of any material such as nylon, Teflon, or any other plastic, rubber, or the like materials useful for this purpose.

It should be readily apparent to anyone skilled in the art that other modifications or numerous variations may be made in the adapter of this invention upon reviewing the foregoing disclosure. For example, other forms of closure means may be employed in conjunction with this adapter to prevent the escape of lubricant during vehicle movement. These modifications or variations that appear to be equivalent and achieve the same results as the preferred embodiments disclosed in this invention are intended to be included within and protected by any claims to patent protection that may issue hereupon. These are merely illustrative.

Having thus described this invention, what is claimed and desired to be secured by Letters Patent is:

1. An adapter for use in mounting an advertising display securely to the stationary axle of a vehicle having an axle nut and grease cap operatively associated therewith, said adapter having an enlarged end provided with a central cavity partially extending therethrough, said cavity being of sufficient size to allow for reception of said adapter upon the end of the stationary axle, means securing said adapter to the axle, said adapter formed having a stem portion integrally connecting with its enlarged end and extending coaxially therefrom, said stem portion being of a lesser diameter than the diameter of the enlarged end and having a length suffiicent to provide for its extension through and projection exteriorly of the associated grease cap, and connecting means provided at the projecting portion of said stem for mounting said advertising display thereto.

2. The adapter of claim 1 wherein the central cavity within the enlarged end is provided with internal threads, and the means securing said adapter to the axle comprises a threaded connection between said enlarged end and the axle upon which the adapter mounts.

3. The adapter of claim 1 wherein the enlarged end of the adapter is rigidly secured to the axle nut, and the means securing said adapter is formed through the threaded connection of said nut upon the axle.

4. The adapter of claim 1 and further characterized by a shoulder formed upon the projecting end of said stem, the portion of said stem extending from the shoulder having external threads, said shoulder and stem extension cooperating to accommodate the advertising display, and a nut threadedly engaging upon said stem and tightening said display securely against said shoulder.

5. The adapter of claim 1 wherein the projecting end of the stem terminates at an end facing, there being a threaded aperture provided centrally partially through the stem and opening at the end facing, and a screw threadedly engaging within the aperture and cooperating with the end facing for securely mounting the advertising display thereto.

6. The adapter of claim 1 wherein said stem portion extends through an aperture provided in the grease cap, and closure means provided proximate the location where the stem projects through said cap to prevent discharge of lubricant therefrom.

7. The adapter of claim 6 wherein the closure means comprises sealing ring which seats upon the inner peripheral edge of the grease cap aperture, the inner surface of said ring sealingly engaging with the surface of the stem portion extending therethrough.

8. The adapter of claim 6 wherein the interconnection between the enlarged end and its integral stem portion is formed as a tapered surface, and said closure means comprises an annulus surrounding said stem and being biased by said tapered surface into contiguity with the location of projection of the stem through the grease cap aperture.

References Cited

UNITED STATES PATENTS

| | | |
|---|---|---|
| 2,146,980 | 2/1939 | Parks. |
| 2,741,047 | 4/1956 | Pollock. |
| 2,754,154 | 7/1956 | Solow. |
| 2,759,282 | 8/1956 | Lecourt. |

EUGENE R. CAPOZIO, Primary Examiner

W. J. CONTRERAS, Assistant Examiner

U.S. Cl. X.R.

301—37